ized polyoctenylene or cylco-octene-cycloene copolymer having an average molecular weight of from 600 to 3000 and (II) one or more of (a) an unsaturated carboxylic acid containing from 6 to 22 carbon atoms, (b) an alcohol containing from 2 to 6 hydroxy groups (c) a hydroxyalkylamine containing at least one hydroxyalkyl group, the hydroxy groups of the alcohols (b) and the hydroxyalkylamines (c) being esterified with an unsaturated carboxylic acid containing from 6 to 22 carbon atoms to an OH number of less than 25, and wherein the ring opening product has an average molecular weight of from 1500 to 10,000 and an acid number of from 0.1 to 20. The invention also relates to a process for producing this lacquer binder and to its use in high-solids lacquer systems.

United States Patent [19]

Fischer et al.

[11] Patent Number: 4,859,746

[45] Date of Patent: Aug. 22, 1989

[54] AIR-DRYING LACQUER BINDER BASED ON POLYOCTENYLENE

[75] Inventors: Herbert Fischer, Duesseldorf; Bernd Wegemund, Haan; Wolfgang Gress, Wuppertal-Elberfeld; Manfred Gorzinski, Duesseldorf, all of Fed. Rep. of Germany

[73] Assignee: Henkel Kommanditgesellschaft auf Aktien, Duesseldorf, Fed. Rep. of Germany

[21] Appl. No.: 109,546

[22] Filed: Oct. 16, 1987

[30] Foreign Application Priority Data

Oct. 16, 1986 [DE] Fed. Rep. of Germany ....... 3635285

[51] Int. Cl.$^4$ ................................................. C08F 8/14
[52] U.S. Cl. ..................................... 525/293; 525/301; 525/303; 528/297
[58] Field of Search ....................... 525/293, 301, 303; 528/297

[56] References Cited

U.S. PATENT DOCUMENTS 4,098,710  7/1978  Elliott et al. ........................ 525/293
4,403,893  9/1983  Hartman et al. ..................... 528/297
4,703,101  10/1987  Singer et al. ........................ 528/297

Primary Examiner—Joseph L. Schofer
Assistant Examiner—Bernard Lipman
Attorney, Agent, or Firm—Ernest G. Szoke; Wayne C. Jaeschke; Henry E. Millson, Jr.

[57] ABSTRACT

Air-drying lacquer binder of a ring-opening product of (I) an epoxidized polyoctenylene or cylco-octene-cycloene copolymer having an average molecular weight of from 600 to 3000 and (II) one or more of (a) an unsaturated carboxylic acid containing from 6 to 22 carbon atoms, (b) an alcohol containing from 2 to 6 hydroxy groups (c) a hydroxyalkylamine containing at least one hydroxyalkyl group, the hydroxy groups of the alcohols (b) and the hydroxyalkylamines (c) being esterified with an unsaturated carboxylic acid containing from 6 to 22 carbon atoms to an OH number of less than 25, and wherein the ring opening product has an average molecular weight of from 1500 to 10,000 and an acid number of from 0.1 to 20. The invention also relates to a process for producing this lacquer binder and to its use in high-solids lacquer systems.

10 Claims, No Drawings

AIR-DRYING LACQUER BINDER BASED ON POLYOCTENYLENE

BACKGROUND OF THE INVENTION

1. Field of the Invention

This invention relates to air-drying lacquer binders and processes for their preparation.

2. Statement of Related Art

Air-drying lacquer binders of the general type to which the present invention telates are known from European Patent application No. 01 85 193. In this case, an unsaturated polymer is used in their preparation, and is selected from unhydrogenated and/or partially hydrogenated polybutadienes, unhydrogenated and/or partially hydrogenated polyisoprenes, copolymers of butadiene and isoprene, polychloroprene, copolymers of polybutadiene with acrylonitrile, styrene, ethene, propene, butene, i-butene, pentene and chloroprene, pentenamer, EPDM rubbers, unsaturated hydrocarbon resins, cyclopentadiene resins and polynorbornene having a number average molecular weight of from 500 to 5000.

DESCRIPTION OF THE INVENTION

Other than in the operating examples, or where otherwise indicated, all numbers expressing quantities of ingredients or reaction conditions used herein are to be understood as modified in all instances by the term "about".

It has now been found that, where special unsaturated polymers are used in the preparation of the lacquer binders of the present invention, an unexpected improvement in the resistance of the lacquer binders to yellowing can be obtained.

The air-drying lacquer binders of the invention are ringopening reaction products of (I) an epoxide of an unsaturated polymer containing from 1 to 12% by weight of epoxide oxygen, based on the weight of the polymer, wherein the unsaturated polymer is a polyoctenylene or a cyclo-octene-cycloene copolymer formed by ring-opening polymerization of cyclo-octene or ringopening copolymerization of cyclo-octene and other cycolenes containing from 5 to 12 carbon atoms, and wherein the polymer before formation of the epoxide has a number average molecular weight of from 600 to 3,000, and (II) at least one unsaturated carboxylic acid or derivative thereof which is one or more of
  (a) an unsaturated carboxylic acid containing 6 to 22 carbon atoms,
  (b) an alcohol containing from 2 to 6 hydroxy groups,
  (c) an hydroxyalkyl amine containing at least one hydroxyalkyl group,
    wherein the hydroxy groups of the alcohols and the hydroxyalkylamines are esterified with one or more unsaturated carboxylic acids containing from 6 to 22 carbon atoms to an OH number of less than 25, and wherein the ring-opening product has a number average molecular weight of from 1,500 to 10,000 and an acid number of from 0.1 to 20.

With respect to reactant (I) above, the unsaturated polymer is a polyoctenylene or cyclo-octene-cycloene copolymer formed by ring-opening polymerization of cyclo-octene or ringopening copolymerization of cyclo-octene and other cycloenes cotaining from 5 to 12 carbon atoms in the presence of metathesis catalysts and preferably having a number average molecular weight of from 600 to 3000. The polyoctenylene suitable for use in accordance with the invention as the unsaturated polymer is formed in the metathesis of cyclo-octene in the presence of tungsten catalysts, more especially $WCl_6$, cf. published German Applications 26 13 999, 20 28 935, and 20 51 799. If the polyoctylene metathesis is carried out in the presence of other mono-unsaturated cycloenes, for example cyclopentene, cyclodecaene or cyclododecaene, which are polymerizable under metathesis conditions, cyclooctene-cycloene copolymers are obtained which may also be used in accordance with the invention. Polyoctenylenes or cyclo-octenecycloene copolymers having iodine numbers of from 80 to 250 and more especially of from 150 to 250 are preferred. Their transcontent is preferably at least 45%.

Polyoctenylenes and cyclo-octene-cycloene copolymers of the above type are also commercially obtainable, for example under the trademark VESTENAMER ®, a product of Huls Aktiengesellschaft.

The epoxidation of the polyoctenylenes or cyclo-octene-cycloene copolymers used in accordance with the invention is carried out similarly to the epoxidation of olefins. The epoxidation process that can be used here is not critical. For example, it is possible to apply any of theusual epoxidation processes, for example epoxidation with per-acids, such as per-acetic acid.

Although epoxidized polyoctenylenes or cyclo-octene-cycloene copolymers containing from 1 to 12% by weight of epoxide oxygen can be used as a reactant in the preparation of the air-drying lacquer binders, an epoxide oxygen content of from 2 to 8% by weight is preferred. Accordingly, almost all the double bonds present in the unsaturated polymers may be epoxidized, in which case those skilled in this art must ensure that satisfactory air drying is achieved through a correspondingly high proportion of reactant (II) i.e. a correspondingly high proportion of unsaturated fatty acids or their derivatives.

The molecular weight of the epoxidized polymers (reactant (I)) as starting compounds is not critical to the air-drying lacquer binders of the invention. However, it is desirable to work within certain limits both with regard to the drying properties of the lacquers and with regard to the viscosity of the polymer solutions. Thus, slowly drying lacquer binders are obtained on the basis of epoxidized polymers having a number average molecular weight of less than 600, whereas in some cases highly viscous products which are difficult to process into highsolids lacquers are obtained for number average molecular weights of more than 5000. As stated above, the number average molecular weight of the unsaturated polymers prior to epoxidation is preferably in the range of from 600 to 3000, and the corresponding epoxidized polymers are preferred for use herein.

The air-drying lacquer binders of the invention contain unsaturated carboxylic acid residues (from reactant (II)) bound as esters as side groups. The carboxylic acid residues emanate from unsaturated carboxylic acids and mixtures thereof. Unsaturated carboxylic acids containing from 6 to 22 carbon atoms are used; they may be used either individually or in admixture in any ratio with one another. Preferred are the mixtures of unsaturated and unsaturated carboxylic acids containing from 12 to 22 and more especially from 16 to 22 carbon atoms which occur in natural fats or oils and which may contain one or more double bonds and, optionally, even saturated impurities. The starting carboxylic acid mixtures have an iodine number of from 50 to 250 and preferably of from 100 to 200. Of particular advantage are mixtures of fatty acids of naturally occurring fats or oils, for example mixtures of fatty acids of palm oil, peanut oil, cottonseed oil, soya bean oil, sunflower oil, linseed oil, rapeseed oil, ricinene oil, animal fats, or marine-animal fats.

The carboxylic acids or carboxylic acid mixtures used to form the air-drying lacquer binders of the invention may also contain aromatically unsaturated carboxylic acids. However, in order not to affect the air-drying character, an upper limit of 50% by weight of the carboxylic acid mixture as a whole has to be imposed for the aromatic carboxylic acids. It is preferred to use only 25% by weight and more preferably only 10% by weight of aromatically unsaturated carboxylic acids. Preferred aromatically unsaturated carboxylic acids are benzoic acid, salicyclic acid and alkyl-substituted derivatives thereof. Where salicyclic acid is used, it is improtant toensure that the OH number of the airdrying binders remains below 25 to guarantee resistance to water. Among the alkyl-substituted benzoic acids and/or salicyclic acids, derivatives containing 1 to 3 methyl, ethyl, propyl, butyl, isobutyl or tertiary butyl groups are suitable.

The air-drying lacquer binders of the invention contain the monocarboxylic acids attached to the polymer molecule either directly through ester groups or via an intermediate group derived from a polyhydric alcohol or a hydroxyalkylamine. Suitable polyhydric alcohols, i.e. alcohols containing 2 to more hydroxy groups, are aliphatic alcohols containing from 2 to 6 hydroxy groups whichmay contain from 2 to 12 carbon atoms and up to 3 ether oxygen atoms. For example, the diols commonly used in the lacquer industry, such as ethylene glycol, propylene glycol, neopentyl glycol or dimers and trimers thereof containing 2 or 3 ether oxygen bridges in the moecule, may be used as dihydric alcohols. Suitable triols are glycerol, trimethylolethane or trimethylolpropane. Suitable tetrahydric alcohols are, for example, pentaerythritol or dimers of the above-mentioned triols. Sorbitan is one example of an aliphatic alcohol containing 6 OH groups. However, it is also possible to use tetramers of the above-mentioned triols containing 3 ether oxygen bridges in the molecule.

Suitable hydroxyalkylamines are those amines which contain at least one hydroxyalkyl group at the nitrogen atom in which the alkyl group contains from 2 to 4 carbon atoms. Monoethanolamine or diethanolamine, for example, is preferably used as the hydroxyalkylamine.

The air-drying lacquer binders according to the invention preferably have a total molecular weight of from 1500 to 10,000 and more preferably of from 1500 to 5000. If the total molecular weight is below the lower limit, the drying times increase. If the molecualr weight is above the upper limit, viscosity increases so that it is difficult to produce high-solids lacquers. The molecular weights measured are number averages and are obtained from the molecular weights of the polymers used (determinable from the colligative properties or from other parameters), the degree of epoxidation and the molecular weight of the modifying agents used.

Preferred modifying agents are polyhydric alcohols, such as trimethylolpropane, ditrimethylolpropane and glycerol.

The present invention also relates to the use of the air-drying lacquer binders of the invention together with the standard additives, such as siccatives, pigments, pigment dispersants, auxiliaries and, optionally, reactive thinners in high-solids lacquer systems.

The present invention also relates to a process for the production of the above air-drying lacquer binders.

The production of the air-drying lacquer binders of the invention starts out from polyoctenylene or cyclo-octene-cycloene copolymers which are first epoxidized as described above. The epoxides are then reacted with the unsaturated carboxylic acids or mixtures thereof. If it is intended to produce products which contain a bridge based on a polyhydric aliphatic alcohol or a hydroxyalkylamine between the polymer molecule and the unsaturated carboxylic acid residue, the epoxidized polymers are first reacted with the corresponding alcohols or hydroxyalkylamines and then esterified with the unsaturated carboxylic acids or mixtures thereof. The reaction of the polymers, for example polyoctenylene, with one or more unsaturated carboxylic acids takes place at temperatures of from 200° to 250° C. and preferably at around 230° C. The reaction is best carried out in an inert gas atmosphere, such as nitrogen. The water of reaction is removed. The reaction may be carried out in the presence of standard catalysts suitable for esterification, such as for example organometallic compounds of the elements tin or titanium. Particularly suitable catalysts are organotin compounds, for example acidic organotin compounds.

A catalyst of the type commercially available as Swedcat TM 3 from Swedstab AB has proven to be particularly suitable. This catalyst is an acidic organotin compound. The reaction can be carried out as such in a stream of nitrogen or in a suitable solvent. Suitable solvents with which the water formed during the esterification may be removed are high-boiling hydrocarbons, for example xylene. Up to 2 moles of fatty acid can be used per mole of epoxide groups. It has proven to be advantageous to use more than 1 mole, but less than 2 moles of fatty acids, for example from 1.7 to 1.9 moles of fatty acid per mole of epoxide groups. The reaction time is normally between 2 and 12 hours, depending on the catalyst and the reaction temperature. It has been found that, where a molar deficit of 15 to 20%, based on equivalence, of 2 moles of fatty acid per mole of epoxide groups is used, the products obtained have both a low OH number and a low acid number. By contrast, if more or less large quantities of carboxylic acid groups are left over for direct equivalence, a troublesome acid number is obtained.

To produce the air-drying lacquer binders according to the ivnention with polyhydric alcohols or hydroxyalkylamines as a bridge between the unsaturated polymer molecule and the unsaturated carboxylic acids or carboxylic acid mixtures, the epoxidized unsaturated polymers are first reacted with the polyhydric alcohols or with hydroxyalkylamines. The reaction may be catalyzed by bases, for example alkali or alkaline earth hydroxides, or by tertiary amines. The reaction temperatures are between 150 and 200° C. and more especially between 160° and 180° C., the reaction times being of the order of a few hours. In order to obtain particularly favorable products, it is advisable in this reaction to initially introduce the catalyst and the polyhydric alcohol or the hydroxyalkylamine into the reaction vessel and to add the epoxidized unsaturated polymer continuously or in portions during the reaction, either as such or in solution. The basic catalyst can be removed by neutralization with acids, for example with HCl, followed by separation, for example by hot filtration. The resulting hydroxyl-group-containing compounds based on polyoctenylene or cyclo-octene-cycloene copolymers are thoroughly esterified with unsaturated monocarboxylic acids until the OH number has fallen below 25, more especially below 15, and preferably below 10, and more preferably below 5. The esterification can be catalyzed in the usual way, for example again using organotin compounds or organotitanium compounds, more especially acidic organotin compounds.

In any event, the objective is to esterify virtually all the OH groups, to keep the residual OH number below 25, and to keep the residual acid number below 15, more especially below 10, and preferably below 5.

The lacquer binders of the invention can be used in air-drying lacquers. To this end, they are provided with the auxiliaries normally used with alkyd resins, particularly air-drying alkyd resins. Thus, lacquers based on the products of the invention may optionally contain pigments, pigment dispersants, film-forming and levelling aids or adhesion promoters. It is advisable to use the siccatives or siccative mixtures and/or antiskinning agents normally used with alkyd resins. Suitable siccatives are those based on compounds of aluminium, cobalt, lead, manganese, zirconium or other transition metals familiar to those skilled in this art in this connection. Favorable results are obtained with siccatives containing both aluminium and zirconium. Important aluminium compounds are the aluminium monoacetyl acetonate dialcoholates. The siccatives are used in the usual quantities. Thus, 0.4 g of a 6% (% by weight Co) cobalt salt solution or 2.5 g of a 6% (parts by weight Zr) zirconium salt solution is normally used per 100 g of resin.

Solutions of the air-drying lacquer binders of the invention in standard lacquer solvents, such as aliphatic or aromatic hydrocarbons having different boiling points, are distinguished by their comparatively low viscosity. Thus, it is possible using the products according to the invention to produce spreadable or sprayable lacquers having solids contents of more than 60% by weight, preferably more than 75% by weight and, in individual cases, up to 90% by weight or higher. In this case, too, it is possible to produce spreadable solvent-free lacquers (full-solid lacquers).

In one preferred embodiment of the invention, the air-drying lacquer binders according to the invention may be processed into solutions in which part of the solvent is replaced by so-called reactive thinners. Reactive thinners are products which, on the one hand, reduce the viscosity of the preparation in the same way as a solvent, but which on the other hand are firmly incorporated in the lacquer film by virtue of their reactivity, in this case their reactivity in the air-drying reaction.

Suitable reactive thinners which may be used together with the lacquer binders according to the invention are polybutadienes, for example cis-1,4-polybutadiene, and unsaturated esters. Suitable unsaturated esters are, primarily, the esters of a $\alpha,\beta$-unsaturated carboxylic acids, for example acrylic acid or methacrylic acid, with unsaturated fatty alcohols, for example with unsaturated oleyl alcohol. Also suitable are the esters of unsaturated fatty acids with unsaturated diols, for example esters of a distilled sunflower oil fatty acid containing a high percentage of oleic acid and linoleic acid with the unsaturated diol, butenediol. The use of reactive thinners such as these, which of course may be counted as solids, leads to lacquer preparations of which the drying is accompanied by the release of only 25% by weight of solvent and, in some cases, only 10% by weight or even less. As can be seen from the Examples, the invention provides for the production of lacquers having a typical alkyd resin application profile and the advantage of high solids content, i.e. minimal solvent released during processing.

The invention is illustrated but not limited by the following Examples.

EXAMPLE 1

EPOXIDATION OF A POLYOCTENYLENE.

Characteristic data of the polyoctenylene

Trans-content 61–62%
Number average molecular weight: 1840 g/mole
Iodine number: 241 g $I_2$/100 g Constituents 300 g polyoctenylene
100 ml white spirit (110°–140° C.)
12 g formic acid (85%)
55 g hydrogen peroxide (70%)

Temperature: 55° C.

Time:
1 h dropwise addition time
2 h after-reaction

Procedure

The polyoctenylene, the white spirit and the formic acid were introduced into a stirring vessel equipped with a condenser, thermometer, heating system, cooling facility, and dropping funnel. After heating, the hydrogen peroxide was added dropwise with cooling; the reaction was exothermic. On completion of the reaction, the reaction mixture was washed 4 times with approx. 600 ml hot water at 90 to 95° C. Thereafter the reaction mixture was substantially acid-free (pH 5–6). It was dried in vacuo (20 mm Hg) at 80 to 100° C. A clear product containing 3.5% epoxide oxygen was obtained.

EXAMPLE 2

The procedure was as in Example 1, except that twice the quantity of formic acid and twice the quantity of hydrogen peroxide were used. The product obtained had an epoxide oxygen content of 8.2%.

EXAMPLE 3

Characteristic data of the polyoctenylene:
Trans-content: approx. 72%
Number Average molecular weight: 1440 g/mole
The polyoctenylene was epoxidized as described in Example 1. The product obtained had an epoxide oxygen content of 3.55%.

EXAMPLE 4

Characteristic data of the polyoctenylene:
Commercial product VESTENAMER ® 8012
80% trans-content.
The procedure was as in Example 2, except that 4 l n-heptane was used as solvent. The product obtained had an epoxide oxygen content of 4.8%.

EXAMPLE 5

In this example, the epoxidized polyoctenylene obtained in Example 1 was esterified with sunflower oil fatty acid (EDENOR® SbO5, a product of Henkel KGaA, Düsseldorf, Federal Republic of Germany).

Constituents

| | |
|---|---|
| 200 g | epoxidized polyoctenylene (3.5% EpO) |
| 208 g | EDENOR ® SbO5 (85% based on EpO) |
| 1.2 g | Swedcat TM 3 |
| 80 ml | xylene/N₂ stream |

Reaction temperature: 195° C.
Reaction time: approx. 12 hours.

The mixture was introduced into a stirring vessel equipped with a heating system, condenser, water separator and thermometer and azeotropically esterified at 195° C. After 6 ml of condensate had formed, the xylene was distilled off. A resin having an acid number of 8.5 mg KOH/g was obtained.

Plate + cone viscosity at 25° C. (Epprecht): DIN 53229

| D in $S^{-1}$ | mPa · S |
|---|---|
| 1250 | 4960 |
| 625 | 6080 |
| 313 | 6080 |
| $n^{20} = 1.4856$ | |

EXAMPLE 6

The product obtained in Example 2 was esterified under the same esterification conditions as in Example 5.

Constituents

| | |
|---|---|
| 150 g | epoxidized polyoctenylene (8.2% EpO) |
| 300 g | EDENOR ® SbO5 (70%, based on EpO) |
| 1.5 g | Swedcat TM 3 |
| 80 ml | xylene/N₂ stream |
| | Condensate formation: 8.2 ml |

The resin obtained had an acid number of 8.2 mg KOH/g.

EXAMPLE 7

The product obtained in Example 3 was esterified under the same esterification conditions as in Example Constituents

| | |
|---|---|
| 250 g | epoxidized polyoctenylene (3.55% EpO) |
| 264 g | EDENOR ® SbO5 (85%, based on EpO) |
| 1.5 g | Swedcat TM 3 |
| 100 ml | xylene/N₂ stream |

Condensate formation: 7.5 ml

A resin having an acid number of 9.5 mg KOH/g was obtained.

Plate + cone viscosity (Epprecht): DIN 53299

| D in $s^{-1}$ | mPa · s |
|---|---|
| 3750 | 2376 |
| 2500 | 2840 |
| 1250 | 3440 |
| 625 | 3520 |
| 313 | 3520 |

EXAMPLE 8

Using the product of Example 7, a white lacquer was prepared on the basis of the following formulation:

| | |
|---|---|
| 476 | parts by weight lacquer binder |
| 400 | parts by weight titanium dioxide (Kronos ® CL310, a product of NL Chemicals, Inc., NYC, NY) |
| 4 | parts by weight Ca octoate, 4% Ca |
| 2 | parts by weight Co octoate, 6% Co |
| 10 | parts by weight Zr octoate, 6% Zr |
| 100 | parts by weight white spirit |
| 10 | parts by weight methylethylketoximine (Dehydril ® NRC, a Henkel KGaA product) |

The solids content of this formulation was approx. 87%.

The test results of the white lacquer thus obtained are shown in the following Table; a white lacquer according to Example 1, no. 8, of European application 01 85 193 was used for comparison.

It can be seen from the Table that the white lacquer prepared with the lacquer binder according to the invention shows better elasticity, more favorable properties in the yellowing test and better gloss retention in the rapid weathering test.

TABLE

| White lacquer films: film thickness 35–40 μm | | | |
|---|---|---|---|
| White lacquers based on | | Example 7 | Comparison Example |
| Set-to-touch time | | 5.5 hours | 1.5 hours |
| Type 338 Erichsen tester | | | |
| Konig pendulum hardness after | 14 days | 20 seconds | 49 seconds |
| (DIN 53157) | 21 days | 20 seconds | 79 seconds |
| 10-days' drying | Erichsen indentation | | |
| + | (DIN 93156) | 8.4 mm | 7.6 mm |
| 3 hours at 100° C. | | | |
| (artificial ageing) | Yellowing* | 1 | 3 |
| Rapid weathering | (% gloss) 20° | | |
| | before weathering | 73 | 113 |
| Q.U.V. apparatus | | | |
| ASTM G 53-77 | (% gloss) 20° | | |
| | after weathering | 66 | 26 |
| Cycl. | | | |
| 4 h UV/60° C. | | | |
| 4 h cond./50° C. | Yellowing* | 1 | 2–3 |
| t: 140 hours | | | |

*0 = pure white
5 = ivory

We claim:

1. The ring-opening reaction product of
   (I) an epoxide of an unsaturated polymer containing from about 1 to about 12% by weight of epoxide oxygen, based on the weight of the polymer, wherein the unsaturated polymer is a polyoctenylene or a cyclo-octene-cycloene copolymer in which the cycloene component contains from 5 to 12 carbon atoms, and wherein the polymer before formation of the epoxide has a number average molecular weight of from about 600 to about 3,000, and
   (II) at least one unsaturated monocarboxylic acid or derivative thereof which is one or more of
      (a) an unsaturated monocarboxylic acid containing 6 to 22 carbon atoms.
      (b) an alcohol containing from 2 to 6 hydroxy groups,
      (c) an hydroxyalkyl amine containing at least one hydroxyalkyl group,
      wherein the hydroxy groups of the alcohols and the hydroxyalkylamines are esterified with one or more unsaturated monocarboxylic acids containing from 6 to 22 carbon atoms to an OH number of less than about 25, and
   wherein the ring-opening reaction product has a number average molecular weight of from about 1,500 to about 10,000 and an acid number of from about 0.1 to about 20.

2. The ring-opening reaction product of claim 1 wherein in (I) the iodine number of the polyoctenylene or of the cyclo-octene-cycloene copolymer is in the range of from about 80 to about 250.

3. The ring-opening reaction product of claim 2 wherein the iodine number is in the range of from about 150 to about 250.

4. The ring-opening reaction product of claim 1 wherein in (I) from about 2 to about 8% by weight of epoxide oxygen is present.

5. The ring-opening reaction product of claim 1 wherein said product has a number average molecular weight of from about 1,500 to about 5,000.

6. The ring-opening reaction product of claim 1 wherein in (I) the polyoctenylene or cyclo-octene-cycloene copolymer has a trans-content of at least about 45%.

7. A process for the preparation of an air-drying lacquer binder comprising the steps of
   (A) reacting an unsaturated polymer which is polyoctenylene or a cyclo-octene-cycloene copolymer in which the cycloene component contains from 5 to 12 carbon atoms and the number average molecular weight of the unsaturated polymer is in the range of from about 600 to about 3,000 with an epoxidizing agent to produce an unsaturated polymer containing from about 1 to about 12% by weight, based on the weight of the polymer, of epoxide oxygen, and
   (B) reacting the epoxidized polymer from step A with at least one unsaturated monocarboxylic acid or derivative thereof which is more of
      (a) an unsaturated monocarboxylic acid containing 6 to 22 carbon atoms,
      (b) an alcohol containing from 2 to 6 hydroxy groups,
      (c) an hydroxyalkyl amine containing at least one hydroxyalkyl group, and
   (C) where in step B one or more of reactants (b) or (c) is employed, esterifying the hydroxy groups of the alcohols and/or the hydroxyalkylamines with one or more unsaturated monocarboxylic acids containing from 6 to 22 carbon atoms to an OH number of less than about 25, to produce a ring-opening reaction product having a number average molecular weight of from about 1,500 to about 10,000 and an acid number of from about 0.1 to about 20.

8. In a high-solids lacquer, the improvement wherein a binder-effective quantity of the ring-opening reaction product of claim 1 is present therein.

9. The high-solids lacquer of claim 8 wherein at least one of the following is also present in the lacquer:
   a siccative, pigment, a pigment dispersant, and a reactive thinner.

10. The high-solids lacquer of claim 9 which contains a reactive thinner which is at least one of 1,4-cis-polybutadiene, an ester of an unsaturated fatty acid with a diol or an unsaturated fatty alcohol, and an ester of an $\alpha,\beta$-unsaturated carboxylic acid with an unsaturated fatty alcohol.

* * * * *